July 3, 1962

T. READ 3,042,030

SPHERICAL TYPE INSERT PLUG FOR BODY
PASSAGEWAY AND TOOL THEREFOR

Filed Nov. 25, 1958

Thane Read
INVENTOR.

BY Clarence A. O'Brien
and Harvey B. Jacobson
Attorneys

3,042,030
SPHERICAL TYPE INSERT PLUG FOR BODY PASSAGEWAY AND TOOL THEREFOR
Thane Read, Rte. 1, Box 470, Tempe, Ariz.
Filed Nov. 25, 1958, Ser. No. 776,242
2 Claims. (Cl. 128—127)

The present invention generally relates to a plug for insertion into a body passageway for blocking the passageway which plug is of a spherical nature in construction and which is particularly adapted for insertion into the Fallopian tubes of a female together with a tool for insertion and removal of such a plug whereby the plug will prevent the passage of an egg or ovum from the Fallopian tubes into the uterus.

Normally, the ovary will deposit ovum adjacent the Fallopian tubes and they will normally enter the open upper end of and proceed down the Fallopian tubes into the uterus. In certain instances, it is desirable to prevent such passage and operations are sometimes performed for the purposes of preventing the flow of an ovum down the Fallopian tubes. Such operations are usually of a permanent nature and of course require extensive surgery. Therefore, it is the primary object of the present invention to provide a plug in the form of a spherical ball constructed of a non-toxic material together with a tool for insertion and removal of the ball whereby the Fallopian tubes may be effectively blocked off or plugged without any surgery or operation at all thereby reducing the dangers inherent in such a procedure and also facilitating the plugging of the Fallopian tubes in a manner which is carried out in a short time and which is effective for carrying out its purposes.

Another object of the present invention is to provide a spherical type plug constructed of a ferrous material or constructed of a material having ferrous inserts therein subject to attraction of magnetism along a tool having permanent magnets or electromagnets connected therewith for holding the ball while inserting or removing from the Fallopian tubes thus facilitating the insertion and removal of the plug.

These together with other objects and advantages which will become subsequently apparent reside in the details of construction and operation as more fully hereinafter described and claimed, reference being had to the accompanying drawing forming a part hereof, wherein like numerals refer to like parts throughout, and in which:

Figure 1:
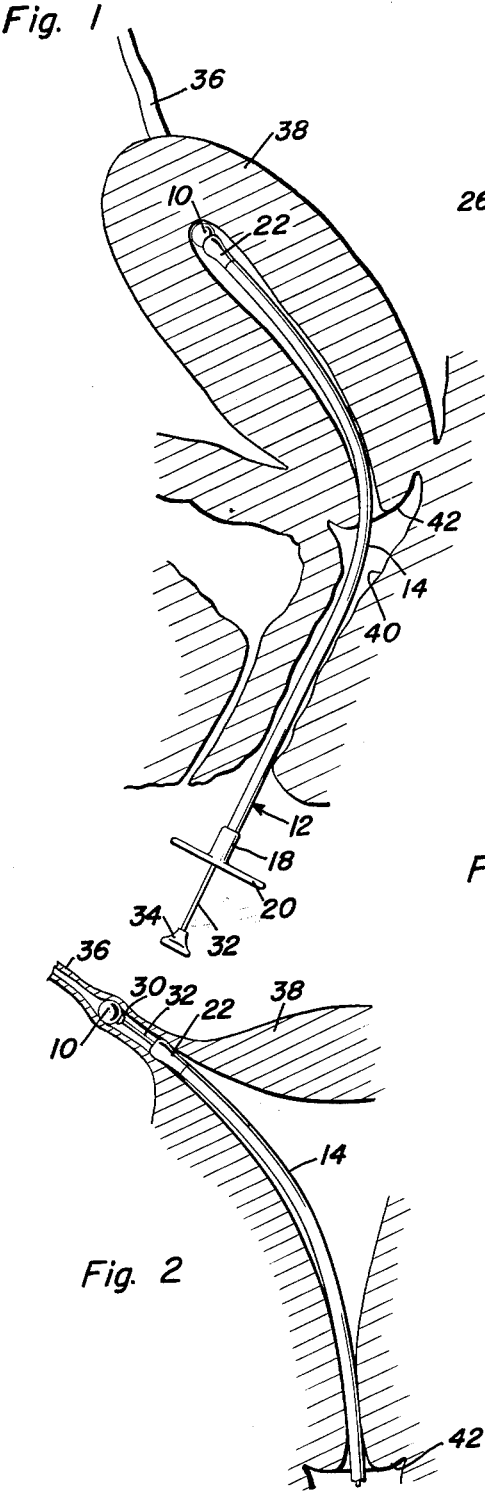
FIGURE 1 is a side elevation of the tool and plug of the present invention illustrating the initial step in inserting the ball or plug.
Figure 2:
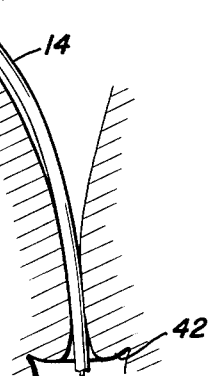
FIGURE 2 is a fragmentary view similar to FIGURE 1 illustrating the second step in inserting the plug.
Figure 4:
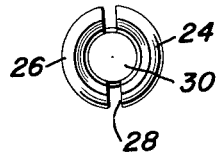
FIGURE 4 is a plan view of the tool illustrating the structure thereof.
Figure 5:
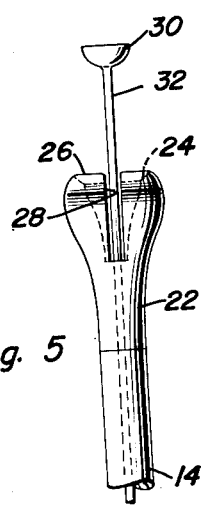
FIGURE 5 is a side elevation of the upper end of the tool illustrating the central section thereof extended for moving the ball away from the magnet.

Referring now specifically to the drawings, the numeral 10 designates a spherical ball which may be constructed of any non-toxic material but which must be a ferrous construction or have ferrous inserts therein so that the same will be subject to attraction by magnetism.

A tool generally designated by the numeral 12 is provided for inserting and removing the ball 10 and the tool 12 includes an elongated member 14 having a longitudinal bore 16 therein. The member 14 may be curved in any suitable manner but is of a self-sustaining material and may be of any suitable material normally used in surgical instruments and could be constructed of plastic, stainless steel, chrome plating or the like.

One end of the elongated member 14 is provided with a sleeve 18 having a pair of laterally extending handles 20 rigid therewith. The other end of the elongated member 14 is provided with a head 22 which has permanent magnets 24 and 26 incorporated therein which receives and attracts the ball pen. The magnets 24 and 26 are separated from each other by slots 28 and an ejector 30 is disposed within the hollow interior of the head 22. The ejector 30 is connected to an elongated flexible wire 32 which extends throughout the bore 16 and beyond the handles 20 and is provided with an operating knob 34 on the inner end thereof. Thus when the ejector 30 is operated, the ball 10 will be pushed away from the magnets 24 and 26 and will be out of the magnetic field thereof thus being retained or left in the position in which it is placed.

Figure 3:
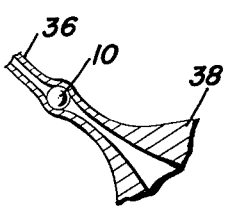
FIGURE 3 is a sectional view of a fragmental nature illustrating the plug or ball inserted in the Fallopian tube and generally the relationship thereof to the upper region of the uterus.
Figure 6:
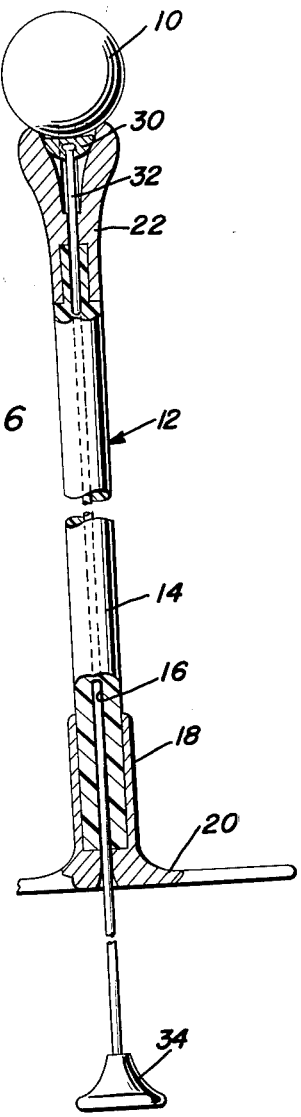
FIGURE 6 is a sectional view of the tool with portions thereof in elevation.

FIGURE 1 illustrates the initial step in positioning the ball 10 in the Fallopian tubes 36 which are connected to the upper end of the uterus 38. The ball 10 along with the head 22 and elongated member 14 is inserted into the vaginal cavity 40 in through the cervix 42 and into the interior of the uterus 38. The tool 12 is then guided so that the head 22 enters into the lower end or a Fallopian tube 36 wherein the knob 34 may then be moved inwardly thus pushing the ejector 30 outwardly and pushing the ball 10 into the Fallopian tube 36 to the desired position and also taking the ball 10 out of the magnetic field of the magnets 24 and 26. Thus, when the ejector 30 is returned, the ball 10 will stay in position in the Fallopian tube 36 as illustrated in FIGURE 3. Of course, the ejector 30 does not have any magnetic qualities and will not be attracted to the ball 10.

The ball 10 is either of a ferrous material subject to attraction by magnetism or of a material having ferrous inserts so that the magnets 24 and 26 will hold the ball 10 in position and will also be capable of removing the ball 10 when desired. Also, this construction of the ball 10 permits the ball 10 to be accurately located by a fluoroscope when it is desired to locate the ball for removal at a later date.

While permanent magnets 24 and 26 have been disclosed, it is pointed out that electromagnets could be employed in lieu thereof and it would then only be necessary to provide a switch for controlling operation of the electromagnets for holding the ball in position while inserting the same and for attracting the ball when the same are to be removed. The use of electromagnets would provide one-piece construction and inherent ease of sterilization and reduction in cost.

The end of the tool may have a single magnet or a pair of magnets as long as the poles of the magnets do not form a chain. Another variation would involve the construction of the handle and shank of one piece of metal or plastic.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. The method of temporarily blocking the Fallopian tubes comprising the steps of supporting a spherical ball subject to magnetic attraction in a magnetic field, moving the magnetic field and ball through the vaginal cavity, through the cervix and into the uterus, positioning the magnetic field and the ball at the lower end of the Fallopian tube, and ejecting the ball out of the magnetic field and into the Fallopian tube to a position where the Fallopian tube frictionally retains the ball in position thereby blocking the Fallopian tube and preventing flow therethrough.

2. A tool for the insertion of a spherical ball of magnetic material into the discharge end of a Fallopian tube comprising an elongated hollow member having a smooth exterior surface, said hollow member having handle means at one end thereof, a head at the other end of said hollow member, said head having a diameter larger than the remainder of the hollow member and having a generally convex external surface, said head having a socket in the outer end thereof, said socket including magnetic means for releasably retaining the ball in the socket, an elongated wire slidably disposed in the hollow member, an ejector on one end of said wire, said ejector being constructed of nonmagnetic material and movable from a position completely received within the socket to a position spaced from the head for moving the ball away from the magnetic means and sufficiently into a Fallopian tube to a position where the Fallopian tube frictionally retains the ball in position thereby blocking flow through the tube, the other end of said wire having a manipulating handle thereon for moving the wire and ejector, said elongated hollow member being constructed of shape sustaining material but capable of curving to conform to the curvature of the body passageways through which it is inserted.

References Cited in the file of this patent

UNITED STATES PATENTS

| | | |
|---|---|---|
| 512,381 | Keyes | Jan. 9, 1894 |
| 520,895 | Petit | June 5, 1894 |
| 1,903,047 | Impey | Mar. 28, 1933 |
| 2,008,380 | Bachmann | July 16, 1935 |
| 2,471,764 | Miller | May 31, 1949 |
| 2,683,618 | Long | July 13, 1954 |
| 2,893,385 | Millar | July 7, 1959 |